May 18, 1926. 1,585,278
C. H. BIERBAUM
ATTACHMENT FOR MICROSCOPES
Filed Dec. 29, 1920   3 Sheets-Sheet 1
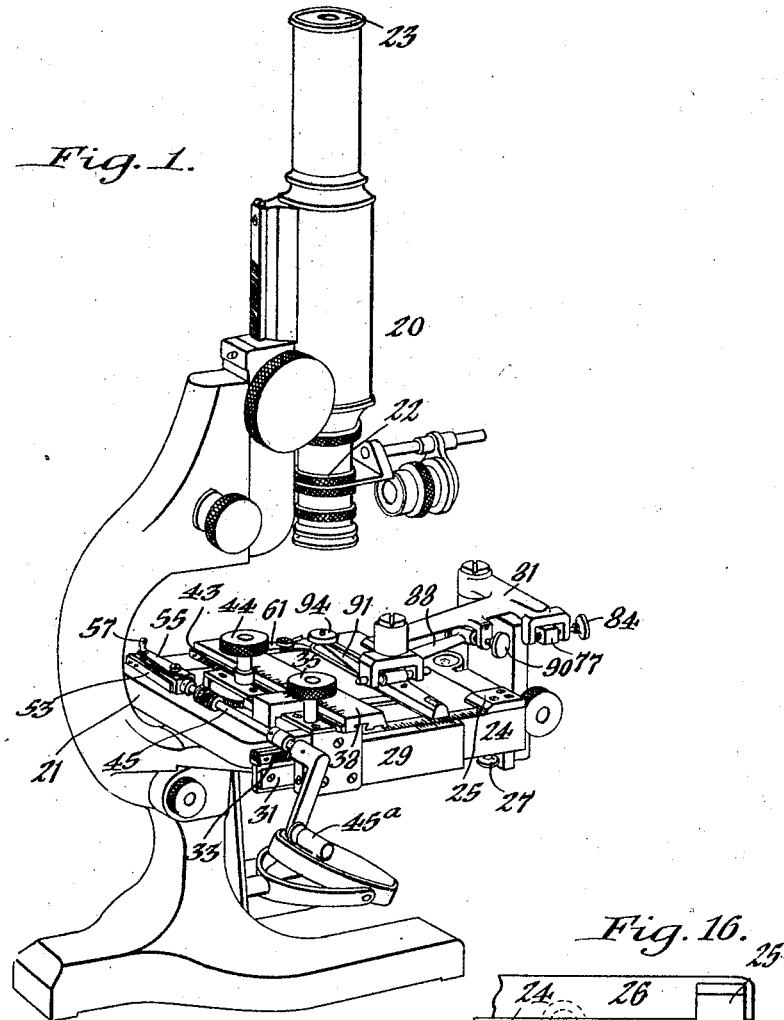
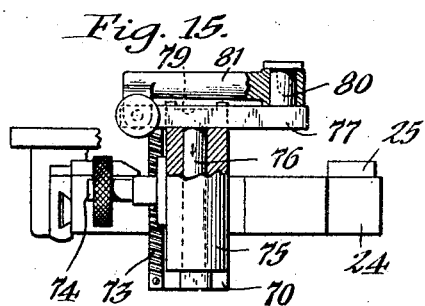
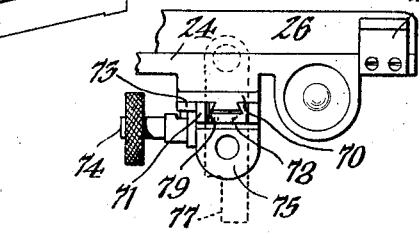

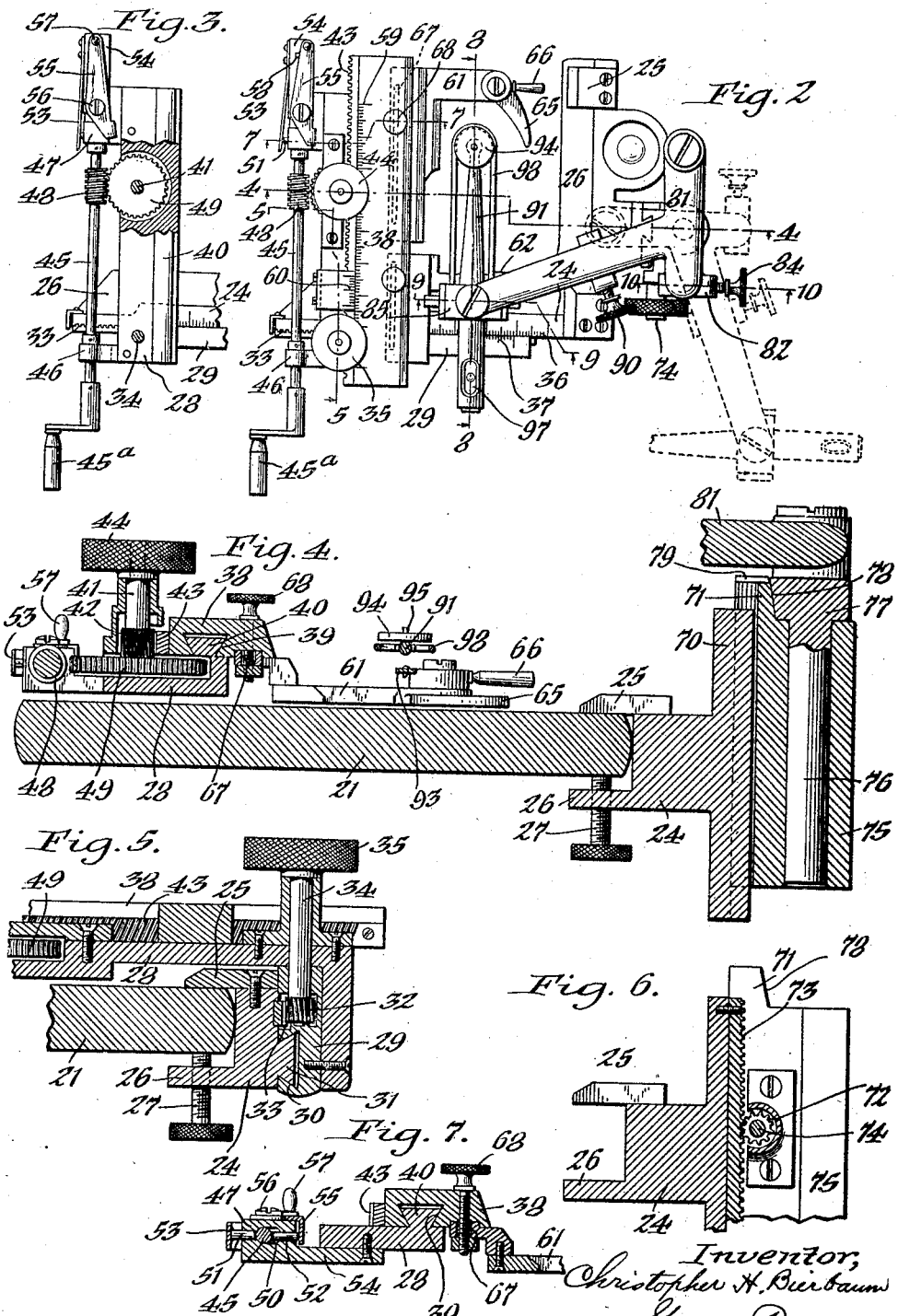

May 18, 1926.
C. H. BIERBAUM
1,585,278
ATTACHMENT FOR MICROSCOPES
Filed Dec. 29, 1920    3 Sheets-Sheet 3
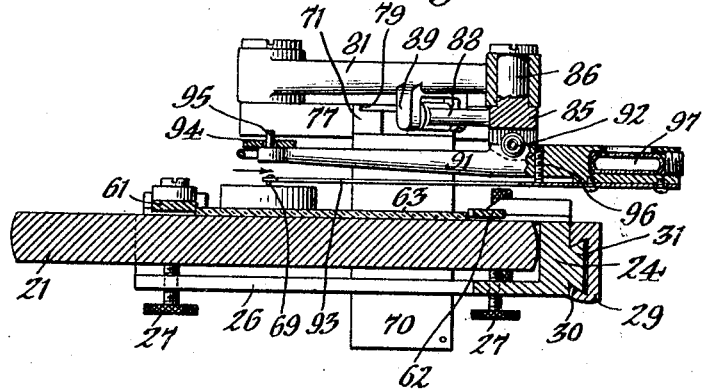
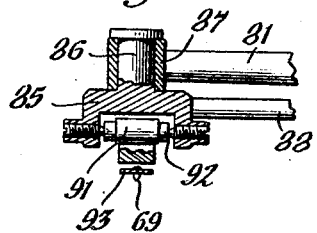
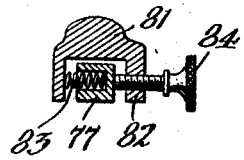
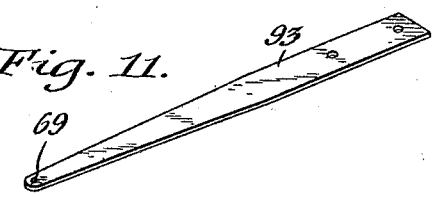
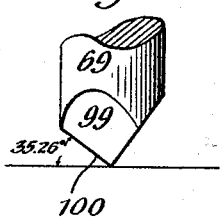
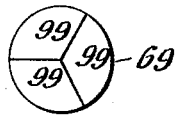
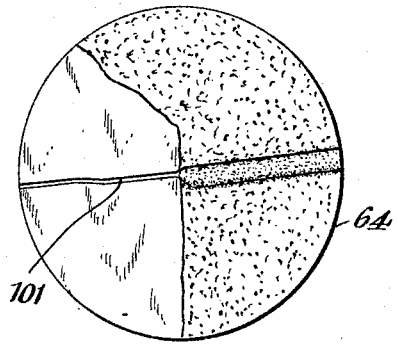
Inventor,
Christopher N. Bierbaum
by Geyer Popp
Attorneys.

Patented May 18, 1926.

1,585,278

UNITED STATES PATENT OFFICE.

CHRISTOPHER H. BIERBAUM, OF BUFFALO, NEW YORK, ASSIGNOR TO AMERICAN SOCIETY OF MECHANICAL ENGINEERS, OF NEW YORK, N. Y., A CORPORATION OF NEW YORK.

ATTACHMENT FOR MICROSCOPES.

Application filed December 29, 1920. Serial No. 433,811.

The essential characteristics of all bearing alloys is a structure made up of alternately hard and relatively soft miscroscopic particles intimately mixed. The function of the hard particles or bearing crystals is to support the load and resist the wear. These bearing crystals should not be hard enough to prove distinctly abrasive to the journal surface. General experience shows that an extreme hardness of the bearing crystals is characterized by an excessive wear of the journal. The function of the softer or more readily abraded crystals is that of being plastic and permitting the bearing crystals to adjust themselves to surface requirements of the journal. These softer crystals are also more readily abraded, and therefore wear slightly below the surface of the bearing crystals and thus form slight depressions upon the bearing surface which serve for the retention of the lubricant.

The importance of a knowledge of the micro-characteristics of alloys has long been appreciated by investigators who have used the microscope in the study of alloys, but the only device heretofore employed for testing the relative hardness of the different crystals has been an ordinary needle point by which a scratch was made across the surface of the crystals to be tested, under as uniform a pressure as possible. The part of the scratch through the soft crystals is deeper and therefore wider than the part through the hard crystals, and by measuring the width of the cut the relative hardness of the crystals is determined. The results obtained with a needle are however unsatisfactory in that it cannot be ground as fine and sharp as a jewel and its control is difficult and irregular.

One of the objects of my invention is the provision of a convenient microscopic attachment which permits a nice and accurate adjustment of the scratching point or cutter and insures a reliable action and control thereof.

A further object is to provide a mounting for the cutter which renders it extremely delicate and sensitive in action, enabling it to follow the undulations or irregularities of the surface of the tested alloy.

The improved attachment, which I have named a "microcharacter", is mounted on the usual stage of a microscope. It comprises, in its general organization, a scratching point, cutter or jewel carried by an arm or bracket and adapted to make an incision across the surface of the alloy to be tested; a carriage for the tested surface which is adjustable to bring said surface in the optical axis of the microscope, and mechanism for slowly and regularly feeding the carriage in the proper direction to carry the test surface past said point. The attachment also includes a delicate elastic mounting for the jewel point, as well as means for adjusting the mounting and its carrying arm to properly position the point.

In the accompanying drawings:

Figure 1 is a perspective view of a microscope equipped with the invention. Figure 2 is a top plan view of the attachment removed from the microscope and showing the micrometer feed thrown out of gear. Figure 3 is a fragmentary sectional plan view of the attachment, showing the micrometer feed thrown into gear. Figure 4 is an enlarged transverse section on line 4—4, Fig. 2. Figure 5 is a fragmentary longitudinal section on line 5—5, Fig. 2, on an enlarged scale. Figure 6 is a vertical section, on an enlarged scale, of the means for raising and lowering the bearing of the suspension bracket. Figure 7 is an enlarged transverse section on line 7—7, Fig. 2, on an enlarged scale. Figure 8 is an enlarged longitudinal section on line 8—8, Fig. 2. Figures 9 and 10 are transverse sections on the correspondingly numbered lines in Fig. 2. Figure 11 is a perspective view of the carrying spring of the cutting point. Figure 12 is a greatly enlarged side elevation of the cutting point. Figure 13 is an end view thereof. Figure 14 is a top plan view of a test-surface showing the cut produced by the instrument. Figure 15 is a fragmentary front elevation of the instrument. Figure 16 is a top plan view of the bearing of the suspension bracket. Figure 17 is a plan view of one of the holding jaws of the carriage.

Similar characters of reference indicate corresponding parts throughout the several views.

The improved attachment is herein shown in connection with a microscope 20 of ordinary construction having the customary stage 21, a vertical illuminator 22 with condensing lenses and an ocular 23 provided with the usual micrometer scale.

24 indicates the stationary horizontal frame of the microcharacter which is preferably L-shaped and provided at its ends and its angle with suitable clamps for removably securing it to the stage 21, this frame extending across the front edge and along one side of the stage. In the preferred construction shown, each of these clamps comprises a jaw 25 extending inwardly over the top of the stage and an opposing ear or jaw 26 carrying a clamping screw 27 which bears against the underside of the stage, as best shown in Figs. 4 and 5.

Mounted on the stage to move both lengthwise and crosswise thereof, is the alloy carriage for the test surface, hereinbefore mentioned. This carriage may be of any appropriate construction, but that shown in the drawings is preferably employed. It is constructed as follows:

Movable transversely of the stage and extending lengthwise thereof, is a primary slide 28 provided at one end with a transverse carrying bar 29. This bar is provided on its inner side with a dovetail groove 30 which receives a corresponding guide-tenon 31 on the contiguous side of the frame 24. This slide is actuated by a pinion 32 carried by its end bar 29 and meshing with a horizontal rack 33 fastened to the outer side of the frame 24, as shown in Fig. 5. This pinion is secured to the lower end of a spindle 34 journaled in the slide-bar 29 and having an operating knob 35 at its upper end. On their adjacent longitudinal edges, said slide-bar 29 and the frame 24 are preferably provided with a scale 36 and a vernier 37, respectively.

Mounted on the primary slide 28 to move lengthwise thereon, is a secondary slide 38 provided on its underside with a dovetail groove 39 which engages a tenon 40 arranged on the upper side of the primary slide, as shown in Figs. 4, 5 and 7. Preferably, the secondary slide is equipped with both rapid and slow feed devices. The rapid feed consists of an upright spindle 41 journaled in the primary slide and carrying a pinion 42 which meshes with a gear rack 43 on the back of the secondary slide 38, as shown in Figs. 2 and 4, the spindle having a knob 44 for turning it. The slow feeding devices of the secondary slide consist of a horizontal shaft 45 journaled in bearings 46, 47 projecting from the rear side of the primary carriage and carrying a worm 48 which engages a worm wheel 49 secured to the spindle 41. This shaft has a crank 45ᵃ for turning it. By the use of this worm gear, the secondary slide is fed slowly and to a relatively small extent lengthwise of the stage 21 for every rotation of the worm shaft 45.

To permit rotation of the spindle 41 independently of this worm shaft 45, the latter is laterally movable to withdraw its worm from the worm wheel 49, as shown in Fig. 2. In the preferred construction illustrated in the drawings, this is accomplished by allowing the shaft 45 to rock horizontally in its front bearing 46 and providing its rear bearing 47 with a horizontally-elongated opening 50, for that end of the shaft, as shown in Fig. 7. Abutting against opposite sides of the rear end of the worm shaft are shifting pins 51, 52 which slide in the walls of the bearing 47. One of these pins is pressed inwardly by a spring 53 carried by a bracket 54 of the primary slide 28 and tending constantly to urge said shaft toward the worm wheel 49, so as to hold the shaft in gear therewith, as shown in Fig. 3. Bearing against the outer end of the other shifting pin 52 is the inner arm of a shipper lever 55 fulcrumed at 56 on the bracket 54 and having a knob 57 for operating it. Upon swinging the long arm of this lever from the position shown in Fig. 3 to that shown in Fig. 2, the inner rear end of the worm-shaft is swung away from the worm wheel 49, disconnecting the worm therefrom. This lever may be locked in this position by a stud 58 behind which the lever snaps on reaching the position shown in Fig. 2.

The secondary slide 38 is preferably provided with a scale 59 and vernier 60 similar to that corresponding parts of the primary slide 28.

Carried by this secondary slide are a pair of spaced horizontal jaws or holders 61, 62, lying closely to the surface of the stage and adapted to grasp between them a plate 63 of glass or other suitable material to which a piece or surface 64 of the alloy to be tested is cemented or otherwise rigidly secured. One of these jaws is preferably provided at its free end with a pivoted spring-pressed finger 65 which engages the rear edge of the said plate and serves to hold it in position between the jaws. This finger, which swings horizontally, is provided with a handle 66 for withdrawing it to release the plate 63. The jaws are adjustable toward and from each other to accommodate different-sized plates, and for this purpose the shank of each jaw may be provided with a longitudinal slot 67 for receiving a clamping screw 68 carried by the secondary slide, as shown in Fig. 7.

69 indicates the scratching point, stylus or cutter past which the test-surface is caused to move by the longitudinal travel of the carriage. This point is carried by an adjustable mounting or bracket preferably constructed as follows:

Rigidly mounted on the front member of the fixed frame 24 is a standard 70 carrying a vertically-adjustable slide 71 which is suitably guided on the standard and which may be adjusted by a pinion 72 meshing with a vertical rack 73 secured to said frame member, as shown in Fig. 6. This pinion is carried by a transverse operating shaft 74 journaled on said slide 71. Carried by this slide is an upright bearing or sleeve 75 which receives a spindle 76 having a T-head 77 which normally rests upon said bearing in a position parallel with the secondary carriage-slide 38, in which position it is retained by a stop face 78 formed by the upper end of the vertical slide 71 which extends above the top of the bearing 75 for this purpose. This T-head may be turned at right angles to its normal position, for a purpose hereinafter more fully described, by raising it above the upper end of the slide 71 and then giving the T-head a quarter turn and allowing it to drop into a locking recess 79 in the upper end of said slide, as shown in Figs. 4 and 16. The spindle 76 is loosely seated in its bearing to permit of this lifting and releasing action of the T-head.

Pivoted on an upright stud 80 at one end of said T-head is a horizontally adjustable bracket 81 of substantially T-shape which carries the mounting of the cutting point. One end of the cross bar of this bracket is fitted upon the pivot-stud 80 while its other end carries a transverse yoke 82 which receives the adjacent end of the T-head 77. Interposed between one of the yoke-jaws and said T-head is a spring 83, while in the opposite jaw is threaded an adjusting screw 84 which bears against the adjacent side of the T-head and serves to adjust the cross bar of the bracket 81 laterally with reference to the T-head, thereby changing the position of the body or main arm of the bracket accordingly.

Mounted at the free end of said bracket is a yoke or carrier 85 having an upright stud 86 capable of oscillating in a bearing 87 of the bracket. This yoke is provided with a laterally-extending arm 88 the outer end of which is made adjustable in a horizontal plane, preferably by a yoke 89 carried by the bracket 81, an adjusting screw 90 and a spring, similar to the yoke 82, spring 83 and adjusting screw 84.

91 indicates a vertically-swinging beam or lever suspended between its ends and slightly above its center of gravity, in the oscillatory yoke 85, preferably by sapphire jewels 92, to minimize friction and render the lever exceedingly sensitive in action. Extending lengthwise along the underside of the lever 91 and secured with its rear portion to the rear arm thereof, is a delicate spring 93, preferably a steel blade, in the free end of which the cutting point 69 is mounted, as best shown in Figs 8 and 11. In its preferred form this spring tapers evenly toward the cutting point.

One or more small weights 94 are placed upon a stud 95 at the front end of the lever 91 directly over the cutting point to cause the latter to exert the desired pressure upon the test-surface.

By this elastic mounting, the point is caused to bear yieldably upon the test-surface, allowing the point to rise and fall as it is traversed by crystals of different degrees of hardness.

Provision is also made for regulating the tension of the spring 93, the device shown in the drawings consisting of a vertical screw 96 arranged in an opening of the lever and bearing upon the spring at a suitable distance from its point of attachment thereto.

A suitable spirit level 97 is carried by the lever, preferably by its rear arm, as shown, to facilitate the adjustment of the jewel-spring 93 to a horizontal position, which is essential to obtain accurate results.

To protect the delicate jewel point and its spring, a suitable guard 98 may be extended around the front and along the sides of the lever 91.

The cutting point may be of any appropriate construction, but it is important that it shall be extremely fine and sharp, hard and tough, and of the proper shape and proportions. It has been found that a jewel point cut from artificial white sapphire (fused $Al_2O_3$) is very satisfactory and meets all requirements. It has also been found that special advantages are possessed by a point having the shape of a corner of a cube, as shown in Figs. 12 and 13, and accurately mounted so that the three facets 99 make equal angles with the test-surface, with one edge of the cube in the direct line of motion of that surface. The leading or advance edge 100 of the cube and the line of cut form an angle of 35.26 degrees (the angle of incision), which insures that the normal pressure upon a crystal is always greater than the transverse pull, thus completely eliminating the objectionable tearing effects of a sharp conical point. This form of the cutting point has the further advantage that its back face is inclined and not abrupt, allowing the point to slide from a hard to a soft crystal without a jump or jar and giving a more accurate reading.

Figure 13 presents an end view of the preferred jewel point, showing the three facets ground at an angle of 54.73 degrees to the axis, each facet being ground after rotating the jewel upon its axis 120 degrees. In its original form the jewel is a small cylinder, say 0.022 inches in diameter and three thirty-seconds of an inch long, and the point is ground and tested before the jewel is mounted. The mounting is preferably done by accurately clamping both the jewel and the jewel spring in a jig or fixture while in the field of the microscope. A heavy solution of specially refined shellac is then applied to the point on the lower side of the spring and permitted to harden. The spring is then removed from the jig and a small amount of this shellac is applied to the jewel on the upper side of the spring. After this has hardened the excessive top length of the jewel is ground off in order to reduce its weight to an absolute minimum. Alcohol should therefore never be used in cleaning the point, xyline being the most desirable solvent to employ.

In the use of the improved attachment, after applying it to the stage of the microscope, as hereinbefore described, the suspension bracket 81 with the said point and other parts carried by it, is swung aside, as shown by dotted lines in Fig. 2. The glass plate with the test-surface of alloy fastened thereto is then placed between the jaws 61, 62, of the carriage, where it is securely held by the spring-pressed finger 65. The carriage is then moved longitudinally to its initial position by turning the spindle-knob 44. The carriage is next adjusted crosswise of the stage by the spindle knob 35 to bring the test-surface in the optical axis of the microscope. Then the suspension bracket 81 is returned to its normal position, as shown by full lines in the drawings, and the bracket and the jewel-point lever 91 are adjusted by means of the screws 84 and 90 to accurately position said lever parallel with the longitudinal line of travel of the carriage and bring the jewel-point in the focal axis. The carriage is then advanced lengthwise of the stage, by the worm feed hereinbefore described, thus feeding the test-surface past the jewel point which makes an incision across it, as shown at 101, in Fig. 14. To insure corroborative results, the test-surface should be moved past the jewel-point at a slow and constant rate, and this requirement is well met by worm gearing. Any other suitable feed mechanism may however be employed for this purpose, and I do not therefore wish to be limited to the particular gearing herein shown and described. Moreover, the rate of travel of the carriage should be so slow that no additional indentation is effected by stopping of the test surface. At the same time, the cutting point should be held in such a manner that while passing from one crystal of the test surface into another, the point can instantly take a new position without having to overcome excessive inertia of moving parts. Accordingly, the jewel itself is reduced in weight as much as possible and carried by an elastic mounting of the character described, which gives the point the requisite sensitiveness and delicacy of action to obtain the desired results.

It is desirable to lubricate the test-surfaces. Standard optical cedar oil having a specific gravity of 0.976 at 15 degrees cent. has been found very satisfactory for this purpose. This oil may be left upon the surface while making the necessary measurements, after which the oil may be left to dry upon the specimen and so form an effective coating against corrosion. The jewel point should be kept clean and should be cleaned immediately after use, since a small amount of oil dried on alone or in connection with other material may produce very erratic and unaccountable results, even though this dried on material be so small as to be barely visible. I have found that elderberry pith wetted with xylol is a very desirable material for cleaning the jewel point. This pith is also very suitable for wiping off the test-surfaces after a cut has been made, since a freshly cut surface of this material will not scratch or mar the test-surfaces and will carry away the loose chips made by the cut. Figure 14 illustrates a micro-cut 101 made by the microcharacter across a portion of a fused tin oxide crystal embedded in bronze. The difference in the width of the cut indicates a difference in hardness between the two materials. This is but an example of a test.

The instrument is adapted for a wide range of such test work, including not only the various bearing alloys, but also all the steels suitable for journals, whether soft or hardened, as well as any other material consisting of microscopic particles of varying hardness.

It is obvious that this improved instrument or attachment may be modified in various respects within the scope of the appended claims, and I do not therefore wish to be limited to the particular embodiment of the invention herein shown and described.

I claim as my invention:

1. The combination with the stage of a microscope, of an attachment of the character described, comprising a frame having means for securing it to the stage, a bracket carried by said frame, a scratching point mounted on said bracket, and a carriage including a primary slide guided on said frame to move crosswise of the stage, a secondary slide guided on said primary slide to move lengthwise of the stage and having a holder for a test-surface, means for adjusting the primary slide, and means for feeding the secondary slide relatively to said scratching point.

2. A microscope attachment, comprising an L-shaped frame having clamping means to engage the front and the side of the microscope-stage, a bracket carried by said frame, a cutter mounted on said bracket, an L-shaped primary slide guided on the transverse member of said frame to move crosswise of the stage, a secondary slide guided on the longitudinal member of said primary slide to move lengthwise of the stage and having a holder for a test-surface, means for adjusting said primary slide, and feed mechanism for said secondary slide.

3. A microscope attachment, comprising a carriage for a test-surface, a standard, a head rotatably mounted on said standard, a bracket mounted on said head, and a cutter carried by said bracket, said standard having a stop for retaining said head in normal position and a locking notch for holding the head in its inoperative position.

4. A microscope attachment, comprising a carriage for a test-surface, a standard, a head rotatably mounted on said standard, a bracket fulcrumed at one end on said head to swing horizontally thereon, means for laterally adjusting the free end of said bracket on said head, and a cutter carried by said bracket.

5. A microscope attachment, comprising a carriage for a test-surface, a standard, a head rotatably mounted on said standard, a bracket provided at its inner end with a cross bar, said cross bar being pivoted at one end to said head and provided at its opposite end with a yoke embracing said head, an adjusting screw carried by said yoke and engaging said head, and a cutter carried by said bracket.

6. In a microscope attachment of the character described, a vertically-swinging carrying member, a yieldable member attached to said carrying member and carrying a cutter point, and a spirit level mounted on said carrying member.

7. A microscope attachment, comprising a carriage for the test-surface, a support overhanging said carriage, a member swiveled on said support, a vertically-swinging lever fulcrumed on said swiveling member, and a cutting point carried by said lever.

8. A microscope attachment, comprising a carriage for the test-surface, a support overhanging the said carriage, a member swiveled on said support, means for adjusting said swiveling member on said support, a vertically-swinging lever fulcrumed on said swiveling member, and a cutting point carried by said lever.

9. A microscope attachment, comprising a carriage for the test-surface, a support overhanging said carriage, a member swiveled on said support and having an adjusting arm, an adjusting device for said arm carried by said support, and a cutting point carried by said lever.

10. A microscope attachment, comprising a carriage for a test-surface, a bracket overhanging said carriage and adjustable in a substantially horizontal plane relatively to the carriage, a member swiveled on said bracket, means for adjusting said swiveling member, a vertically-swinging lever fulcrumed on said swiveling member, and a cutting point carried by said lever.

11. A microscope atachment, comprising a carriage for a test-surface, a bracket overhanging said carriage and adjustable both in vertical and horizontal planes relatively to said carriage, a member mounted to swivel horizontally on said bracket, a vertically-swinging lever fulcrumed on said swiveling-member, and a cutting point carried by said lever.

12. In a microscope attachment of the character described, a carriage for a test-surface, combined with a cutting point having the shape of the corner of a cube, the three facets of the point making equal angles with the test-surface and one edge of the point facing the direct line of travel of said carriage.

CHRISTOPHER H. BIERBAUM.